(12) United States Patent
Gallier et al.

(10) Patent No.: US 11,085,315 B2
(45) Date of Patent: Aug. 10, 2021

(54) TURBINE ENGINE WITH A SEAL

(71) Applicant: General Electric Company, Schenectady, NY (US)

(72) Inventors: Kirk Douglas Gallier, Cincinnati, OH (US); David Alan Frey, West Chester, OH (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 16/505,888

(22) Filed: Jul. 9, 2019

(65) Prior Publication Data
US 2021/0010380 A1 Jan. 14, 2021

(51) Int. Cl.
*F01D 11/00* (2006.01)
*F16J 15/16* (2006.01)

(52) U.S. Cl.
CPC ........... *F01D 11/006* (2013.01); *F16J 15/164* (2013.01); *F05D 2220/32* (2013.01); *F05D 2240/55* (2013.01); *F05D 2240/58* (2013.01); *F05D 2250/13* (2013.01)

(58) Field of Classification Search
CPC .... F01D 11/006; F01D 11/003; F01D 11/005; F01D 5/20; F01D 11/08; F01D 11/12; F01D 11/122; F05D 2240/55; F05D 2240/58; F05D 2250/13; F16J 15/164; F16J 15/56; F16J 15/3412; F16J 9/20; Y10S 277/909
USPC ................................................. 277/909, 387
See application file for complete search history.

(56) References Cited

U.S. PATENT DOCUMENTS

| | | | | |
|---|---|---|---|---|
| 1,862,983 A | * | 6/1932 | Roberts | F16J 9/20 277/454 |
| 2,186,020 A | * | 1/1940 | Hall | F16J 9/08 277/453 |
| 3,129,922 A | | 4/1964 | Rosenthal | |
| 3,587,155 A | * | 6/1971 | Packard | B24B 19/11 29/888.075 |
| 3,834,719 A | * | 9/1974 | Shin | F16J 9/02 277/452 |
| 4,063,722 A | * | 12/1977 | Mailliet | C21B 7/12 266/273 |
| 4,438,937 A | * | 3/1984 | Moriarty | F16J 9/20 277/447 |
| 4,681,326 A | * | 7/1987 | Kubo | F16J 9/12 277/447 |
| 5,826,681 A | * | 10/1998 | Kubo | F16D 65/18 188/71.8 |

(Continued)

FOREIGN PATENT DOCUMENTS

| | | |
|---|---|---|
| CN | 105057988 A | 11/2015 |
| EP | 30309344 A | 3/1989 |

(Continued)

*Primary Examiner* — Igor Kershteyn
*Assistant Examiner* — Topaz L. Elliott
(74) *Attorney, Agent, or Firm* — McGarry Bair PC

(57) ABSTRACT

An apparatus and method of sealing for an engine component between two surfaces arranged in spaced relationship to define a gap. A groove located is located in one of the two surface for receiving a seal having a body with a multi-faceted cross-sectional shape defining multiple seal facets. At least one of the multiple seal facets contacts one or both of the two surfaces.

20 Claims, 8 Drawing Sheets

(56) References Cited

U.S. PATENT DOCUMENTS

| | | | | |
|---|---|---|---|---|
| 5,941,537 A * | 8/1999 | Wallace | ................ | F01D 17/162 |
| | | | | 277/642 |
| 6,676,131 B1 | 1/2004 | Hedin | | |
| 7,017,914 B1 * | 3/2006 | Sytsma | .................... | F02F 3/00 |
| | | | | 277/452 |
| 7,191,875 B2 * | 3/2007 | Kurimoto | ............. | F16J 15/164 |
| | | | | 188/71.8 |
| 7,523,944 B2 * | 4/2009 | Hatori | ................... | F16J 15/441 |
| | | | | 277/460 |
| 7,815,195 B2 * | 10/2010 | Meller | ................. | F16J 15/3204 |
| | | | | 277/500 |
| 8,079,600 B2 | 12/2011 | Shojima | | |
| 9,995,160 B2 * | 6/2018 | Sarawate | ............. | F01D 25/162 |
| 10,125,870 B2 * | 11/2018 | Mittler | ...................... | F16J 9/20 |
| 10,267,421 B2 * | 4/2019 | Ohya | ................... | F16J 15/3412 |
| 2002/0189263 A1 * | 12/2002 | Rayer | .................. | F04D 27/023 |
| | | | | 60/782 |
| 2003/0024777 A1 * | 2/2003 | Kurimoto | ............. | F16J 15/164 |
| | | | | 188/72.3 |
| 2006/0055120 A1 * | 3/2006 | Umetsu | ................. | F16J 15/441 |
| | | | | 277/459 |
| 2010/0194056 A1 * | 8/2010 | Nanri | ................... | F16J 15/3204 |
| | | | | 277/587 |
| 2012/0018957 A1 * | 1/2012 | Watanabe | ............. | F16J 15/441 |
| | | | | 277/387 |
| 2014/0035240 A1 * | 2/2014 | Sha | ....................... | F01D 11/003 |
| | | | | 277/641 |
| 2014/0116372 A1 * | 5/2014 | Nishimura | ........... | F02D 9/1035 |
| | | | | 123/184.46 |
| 2016/0177757 A1 * | 6/2016 | Sarawate | ............. | F01D 25/162 |
| | | | | 415/1 |
| 2016/0238134 A1 * | 8/2016 | Ohya | .................... | F16J 15/441 |
| 2016/0281516 A1 | 9/2016 | Heaven et al. | | |
| 2016/0376900 A1 * | 12/2016 | Goller | .................. | F01D 11/003 |
| | | | | 415/148 |
| 2017/0130840 A1 * | 5/2017 | Mittler | ....................... | F16J 9/20 |
| 2018/0306120 A1 * | 10/2018 | Shi | ............................. | F23R 3/60 |
| 2019/0085981 A1 * | 3/2019 | Yamaguchi | ............... | F16J 15/18 |
| 2020/0096103 A1 * | 3/2020 | Mittler | ..................... | F16J 9/206 |

FOREIGN PATENT DOCUMENTS

| | | |
|---|---|---|
| EP | 3093447 A1 | 11/2016 |
| JP | 2017180190 A | 10/2017 |

* cited by examiner

TURBINE ENGINE WITH A SEAL

STATEMENT REGARDING FEDERALLY SPONSORED RESEARCH OR DEVELOPMENT

This disclosure was made with government support under Contract No. FA8650-15-D-2501 awarded by the United States Air Force. The Government has certain rights in this invention.

TECHNICAL FIELD

This disclosure generally relates to turbine engines and more specifically relates to sealing of components of a turbine engine.

BACKGROUND

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components which require cooling.

Containing the cooling fluid used to cool the engine components is important to ducting and moving the cooling fluid to components needing cooling throughout the engine. Therefore seals between axially and radially disposed engine components is necessary to block leakage and flow cooling fluid to the desired areas of the engine.

BRIEF DESCRIPTION

In one aspect, embodiments relate to a seal assembly comprising a first surface and a second surface arranged in a spaced relationship to define a gap, a groove located in the second surface and having at least three non-orthogonal, planar groove facets, and a seal having a body with a height greater than a depth of the groove and a multi-faceted cross-sectional shape defining multiple seal facets, with a sub-set of the seal facets being complementary to the groove facets, and at least one of the seal facets abutting the first or second surface.

In one aspect, the disclosure relates to a turbine engine comprising a first surface and a second surface each extending between a low pressure region and a high pressure region and arranged in a spaced relationship from each other to define a gap, a groove located in the second surface and having at least three non-orthogonal, planar groove facets; and a seal having a body with a height greater than or equal to a depth of the groove and a multi-faceted cross-sectional shape defining multiple seal facets, with a sub-set of the seal facets being complementary to the groove facets and including a high pressure angled facet facing the high pressure region and a low pressure angled facet facing the low pressure region, and at least one of the seal facets abutting the first surface.

In one aspect the disclosure relates to a method of sealing a gap located in a turbine engine between first and second surfaces, the second surface including a groove in which a seal having a body extending between an outer seal facet and an inner seal facet is located, the method comprising flowing a high pressure airflow into the groove along at least one of three non-orthogonal planar groove facets between the body and the groove, and pushing the outer seal facet toward the first surface.

DETAILED DESCRIPTION

Figure 1:
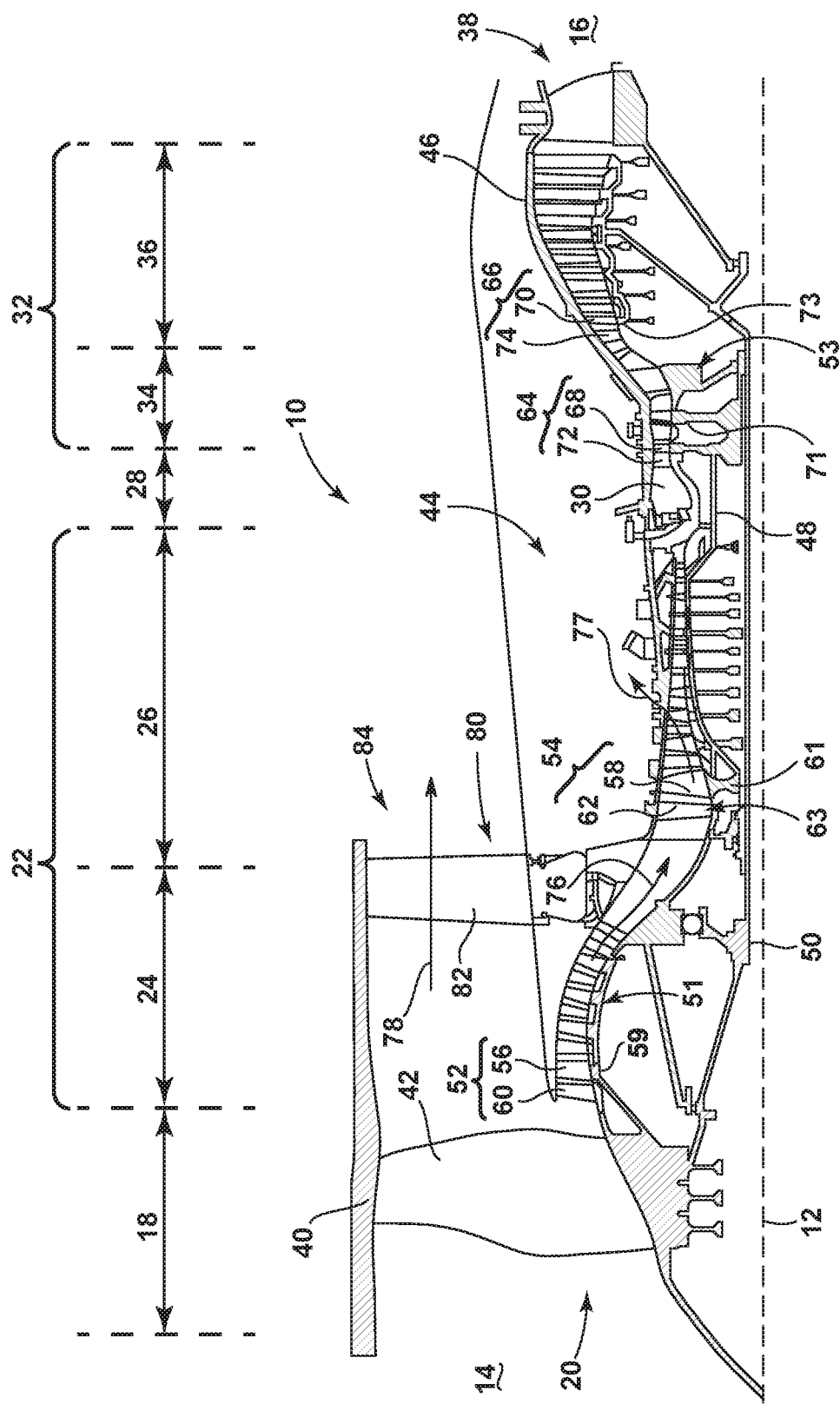
FIG. 1 is a schematic cross-sectional diagram of a turbine engine for an aircraft.

Aspects of the present disclosure are directed to a seal for a gap located between opposing surfaces located within a turbine engine. For the purposes of description, the seal will be described with respect to a variable turbine vane assembly. It will be understood that the disclosure may have general applicability for any engine component requiring sealing between opposing surfaces in an engine, including turbines and compressors and non-airfoil engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
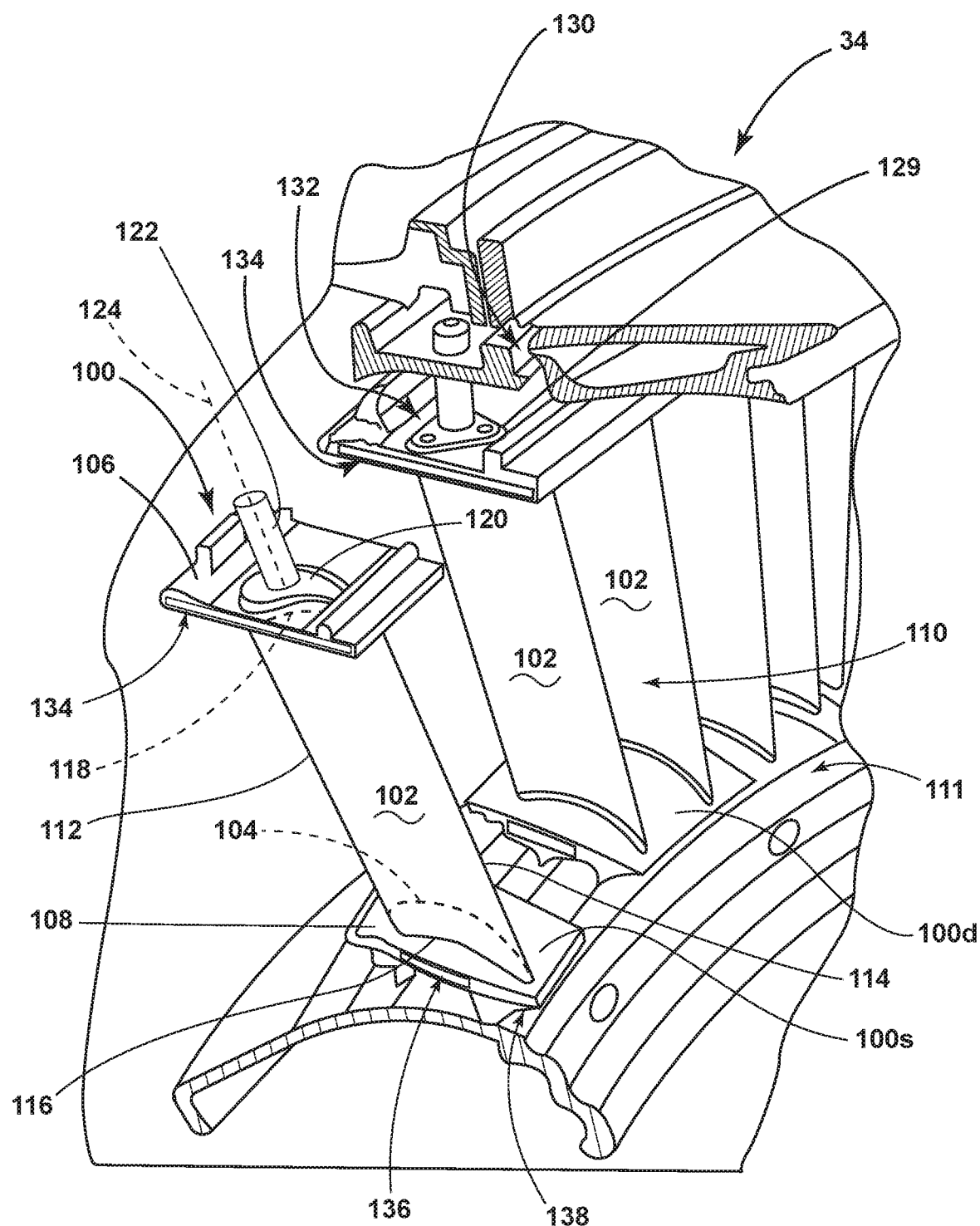
FIG. 2 is a perspective view of a portion of the turbine engine with a plurality of vane assemblies illustrated as an exemplary variable turbine vane assembly.

Referring to FIG. 2 a portion of the engine 10 is shown in detail, by way of non-limiting example a plurality of exemplary variable turbine vane (VTV) assemblies 100 located within the HP turbine 34 are illustrated. A singlet VTV assembly 100s is illustrated along with a doublet VTV assembly 100d. Each of the VTV assemblies 100 illustrated includes a vane 102 shaped as an airfoil 104 and extending between outer and inner bands 106, 108. A pair of vanes 102 together define a nozzle 110 therebetween. A plurality of VTV assemblies 100 can be arranged circumferentially to form a gas turbine nozzle assembly 111.

Each vane 102 extends substantially axially between a leading edge 112 and trailing edge 114. The vane 102 spans radially from a root 116 to a tip 118 where the root 116 can be rotatably mounted to the inner band 108 and the tip 118 can be rotatably mounted to the outer band 106. In the exemplary VTV assembly 100, the root 116 and tip 118 can include a flanged portion 120 from which a shaft 122 extends to define a rotatable axis 124 about which the vane 102 can rotate.

Several surfaces illustrated abut other surfaces and during operation can require sealing therebetween. Exemplary locations for placement of a seal assembly 129 according to aspects of the disclosure herein are numbered 130, 132, 134, 136, and 138. By way of non-limiting example location 132 is where the vane 102 moves independently of the outer and inner bands 106, 108 and could therefore necessitate the seal assembly 129. Other locations include where seals known in the art, including but not limited to snap rings, retaining rings, and circlips are located within the turbine engine 10.

Figure 3A:
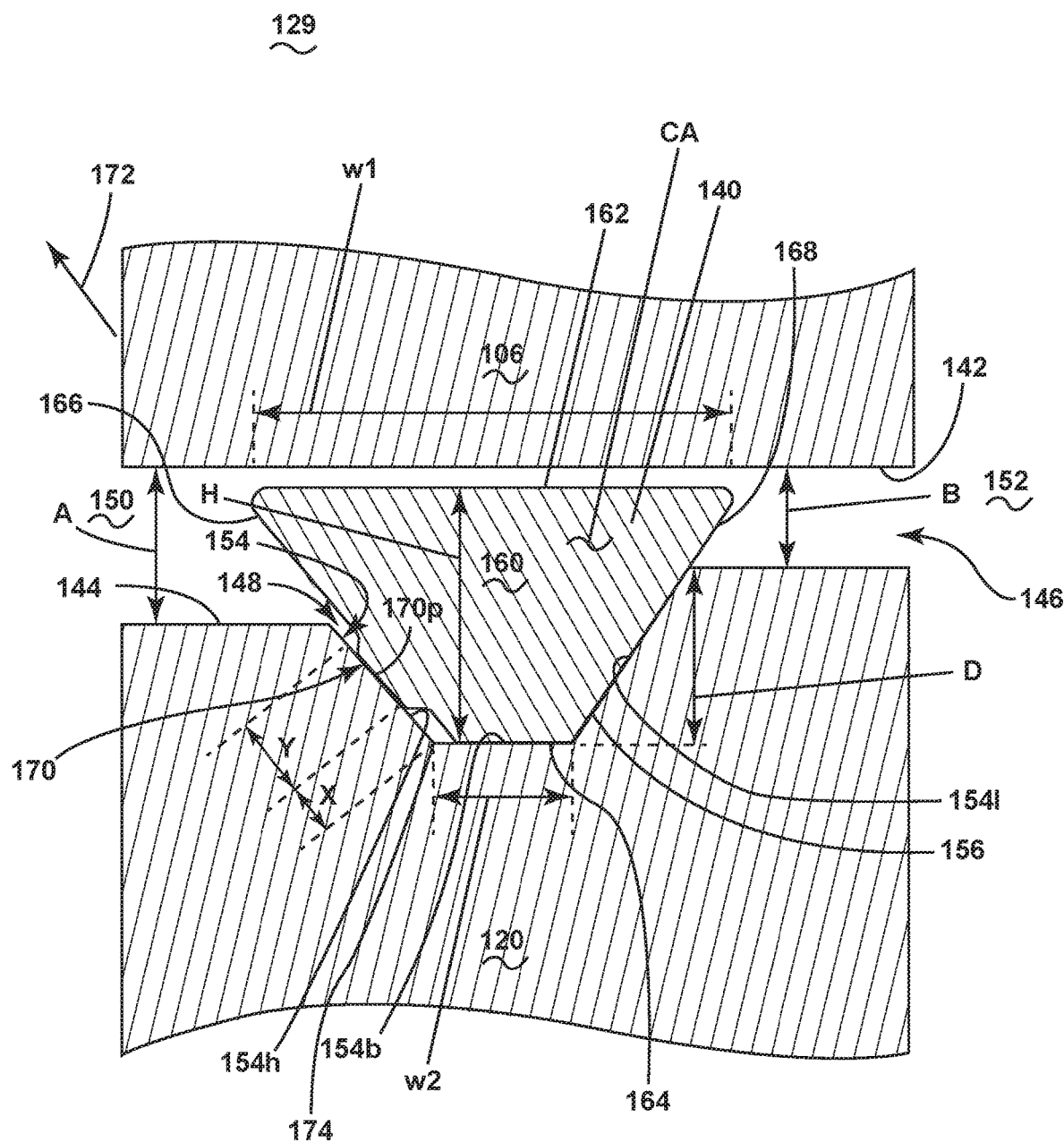
FIG. 3A is schematic cross-sectional diagram of a seal for the exemplary variable turbine vane assembly of FIG. 2 with the seal in a first position.

FIG. 3A is an enlarged view of exemplary placement the seal assembly 129 having a seal 140 for any one of the locations 130, 132, 134, 136, and 138 from FIG. 2. The seal 140 is in a first position, by way of non-limiting example prior to the engine operating. Opposing first and second surfaces 142, 144 are spaced from each other to define a gap 146 therebetween. By way of non-limiting example location 132 where the first surface 142 can be defined by the outer band 106 of the VTV assembly 100 and the second surface 144 can be defined by the movable flanged portion 120 of the VTV assembly 100. Both surfaces 142, 144 can also be static or both surfaces can be moving. It is further contemplated that the first surface 142 can be moving and the second surface 144 can be static. In a non-limiting example described herein, the first surface 142 can be a static surface while the second surface 144 can be a moving surface. As described herein, moving can mean translating or rotating. Furthermore one surface can be moving with respect to the other surface intermittently or continuously.

A groove 148 is located in the second surface 144 for receiving the seal 140. It should be understood that the groove 148 and seal 140 can be complementary and annular wherein the seal 140 is a circular seal seated in an annular groove 148. The groove 148 extends into the second surface 144 a maximum depth (D). The groove 148 separates a high pressure region 150 of the turbine engine 10 from a low pressure region 152 of the turbine engine 10. The high and low pressure regions 150, 152 are relative to each other at the location of the engine component in which the groove 148 is located. In other words, the high pressure region 150 has a higher pressure when compared to the low pressure region 152. While these regions 150, 152 can be located anywhere in the engine, they should not be confused with the high pressure turbine 34 and the low pressure turbine 36 or the like.

The gap 146 is spaced a dimension (A) between the first and second surfaces 142, 144 on the high pressure region side 150 of the groove 148 and a dimension (B) between the first and second surfaces 142, 144 on the low pressure region side 152 of the groove 148. A ratio of (AB) can fall within the range 1<(AB)<2. The different dimensions (A), (B) geometrically contribute to establishing the relative high and low pressure regions 150, 152.

The groove 148 can be defined by at least three non-orthogonal, planar groove facets 154: a groove base 154$b$, and opposing groove sides 154$h$, 154$l$. An opening 156 to the groove 148 can extend between the opposing groove sides 154$h$, 154$l$ separating the high pressure region 150 from the low pressure region 152. The planar groove facets 154 are formed to receive the seal 140. In other words the planar groove facets 154 are complementary to a multi-faceted cross-sectional body 160 of the seal 140. In one aspect the groove 148 can have a generally trapezoidal cross-sectional shape.

The body 160 defines a cross-sectional area (CA) with a height (H) greater than the maximum depth (D) of the groove 148. The cross-sectional area (CA) of the body 160 defines a multi-faceted cross-sectional shape of the seal 140 which has multiple seal facets 162, 164, 166, 168, or surfaces. The cross-sectional area (CA) can extend vertically with respect to the first and second surfaces 142, 144 between an outer seal facet 162 and an inner seal facet 164 to define a height (H). A sub-set of the seal facets are complementary to the groove facets and include a high pressure (HP) angled facet 166 facing the high pressure region 150 and a low pressure (LP) angled facet 168 facing the low pressure region 152. In one non-limiting example, the multi-faceted cross-sectional shape is a trapezoid.

The outer seal facet 162 can define a width (W1) and the inner seal facet 164 can define a width (W2), where (W1) can be greater than (W2). A ratio of (W1/W2) can fall within the range 2<(W1/W2)<5 or 0.2<(W2/W1)<0.5. The geometry of the body 160 is formed to optimize any leakage amounts while preventing unwanted rotation of the seal 140. In one aspect, the ratio of (H/W2) can fall within the range 0<(H/W2)<1 in order to prevent rotation. Allowing controlled leakage enables pressure balance.

A surface feature 170 can be located along the HP angled facet 166. The surface feature 170 can be a protrusion 170$p$ spaced from the inner seal facet 164 a first dimension (X), a distance measured along the HP angled facet 166 in a direction illustrated by arrow 172 from the inner seal facet 164 toward the outer seal facet 162. The surface feature 170 can extend in the direction 172 a distance (Y) along the HP angled facet 166. A ratio (X/Y) can fall within the range 0<(X/Y)<1 providing an inner channel defined by the distance (X) located within the groove 148.

Figure 3B:
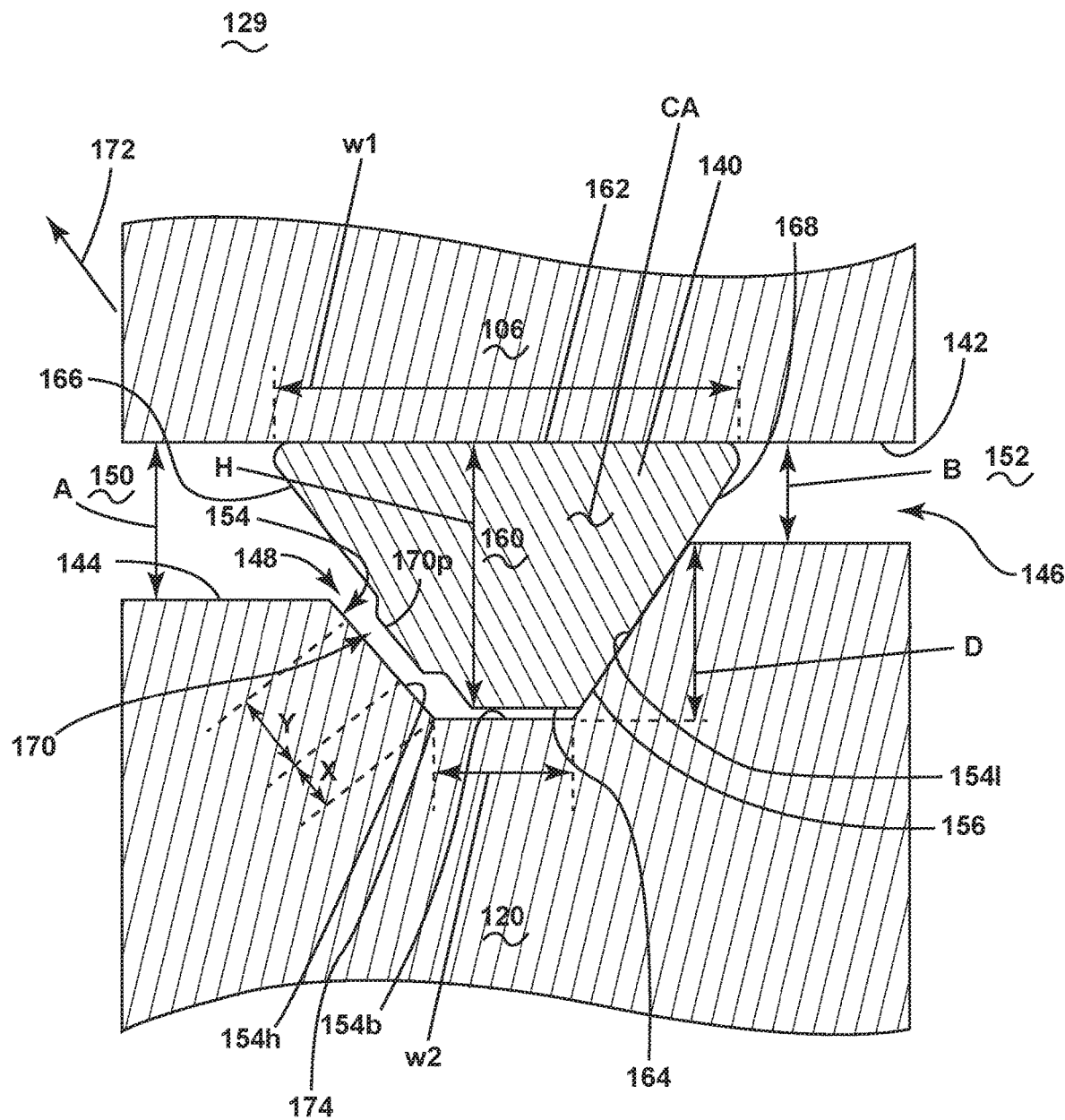
FIG. 3B is schematic cross-sectional diagram of FIG. 3A in a second position.

FIG. 3B illustrates the seal in a second position during operation when the seal 140 is in contact with the first surface 142.

Figure 4:
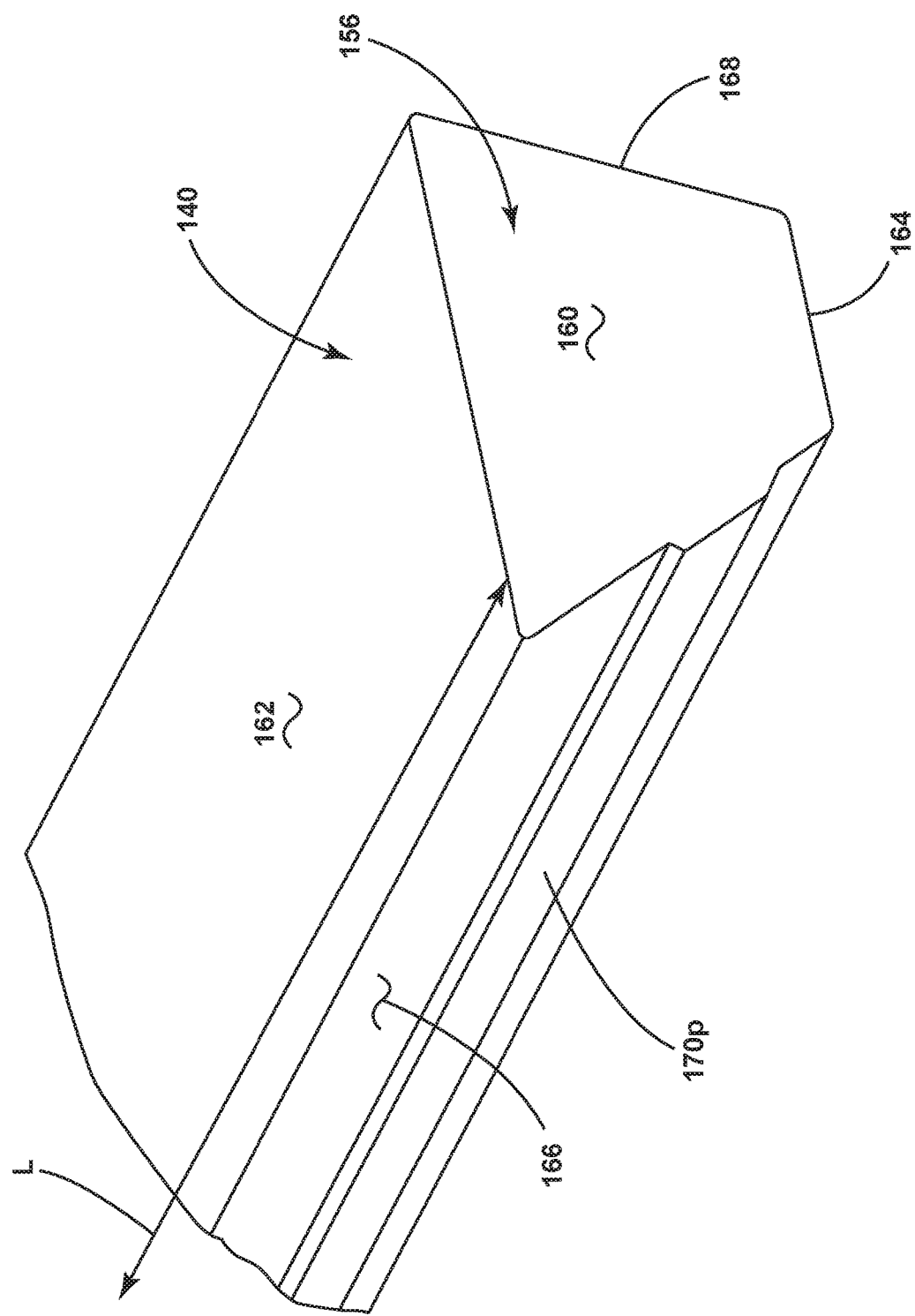
FIG. 4 is an isometric view of the seal from FIG. 3 according to an aspect of the disclosure herein.

FIG. 4 is an isometric view of the seal 140 which more clearly shows the surface feature 170. It can more clearly be seen that the protrusion 170$p$ can extend along a full length (L) of the seal 140. While illustrated as being located on the HP angled facet 166, it should be understood that the surface feature 170 can be located on the LP angled facet 168 or on both the HP and LP angled facets 166, 168.

Figure 5:
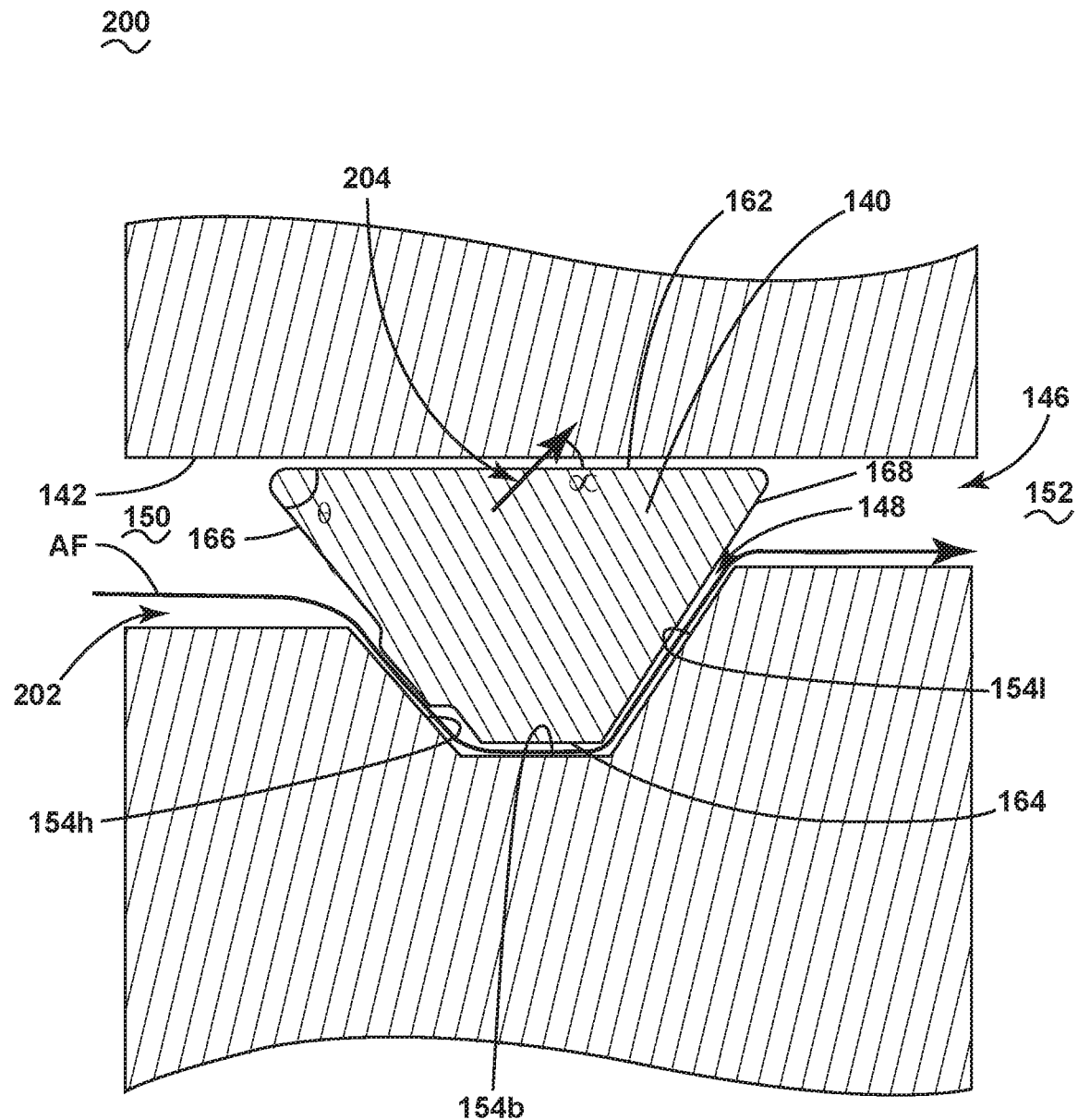
FIG. 5 is the same as FIG. 3 illustrating a method of sealing a gap with the seal of FIG. 3.

Turning now to FIG. 5, the seal 140 is illustrated as in FIG. 3, however some notations have been removed for clarity to illustrate method 200, by which the gap 146 is sealed. While illustrated as not contacting the first or second surfaces, it should be understood that the seal during the method is moving between the first and second positions as illustrated in FIG. 3A and FIG. 3B. An airflow (AF) will naturally flow from the high pressure region 150 to the low pressure region 152. To control and/or prevent such an airflow (AF), the seal 140 is provided within the groove 148. The method 200 includes at 202 flowing the airflow (AF) into the groove 148 along at least one of three non-orthogonal planar groove facets 154$h$, 154$b$, 154$l$ between the body 160 and the groove 148. The amount of airflow depends on the location of the surface feature 170 and the geometry of the surface feature 170 previously described herein. At 204 the method 200 includes pushing the outer seal facet 162 toward the first surface 142 into the second position. When the airflow (AF) contacts the seal 140, due to the non-orthogonal planar surface orientation, the push is at an angle, by way of non-limiting example a 30 degree angle relative to the outer seal facet 162. The introduction of the high pressure airflow to the groove 148 imparts pressure on the inner seal facet 164 which pushes the seal 140 away from the groove base 154b and toward the first surface 142. More specifically higher pressure in the high pressure region 150 imparts a force on surface feature 170 which in turn pushes the seal 140 toward the low pressure region 152 enabling a controlled leakage of the high pressure airflow within the groove 148.

The method 200 can include engaging the outer seal facet 162 with the first surface 142. The method 200 can also include engaging at least one of the non-orthogonal planar groove facets 154h, 154b, 154l with the protrusion 170 extending from the HP angled facet 166.

Figure 6:
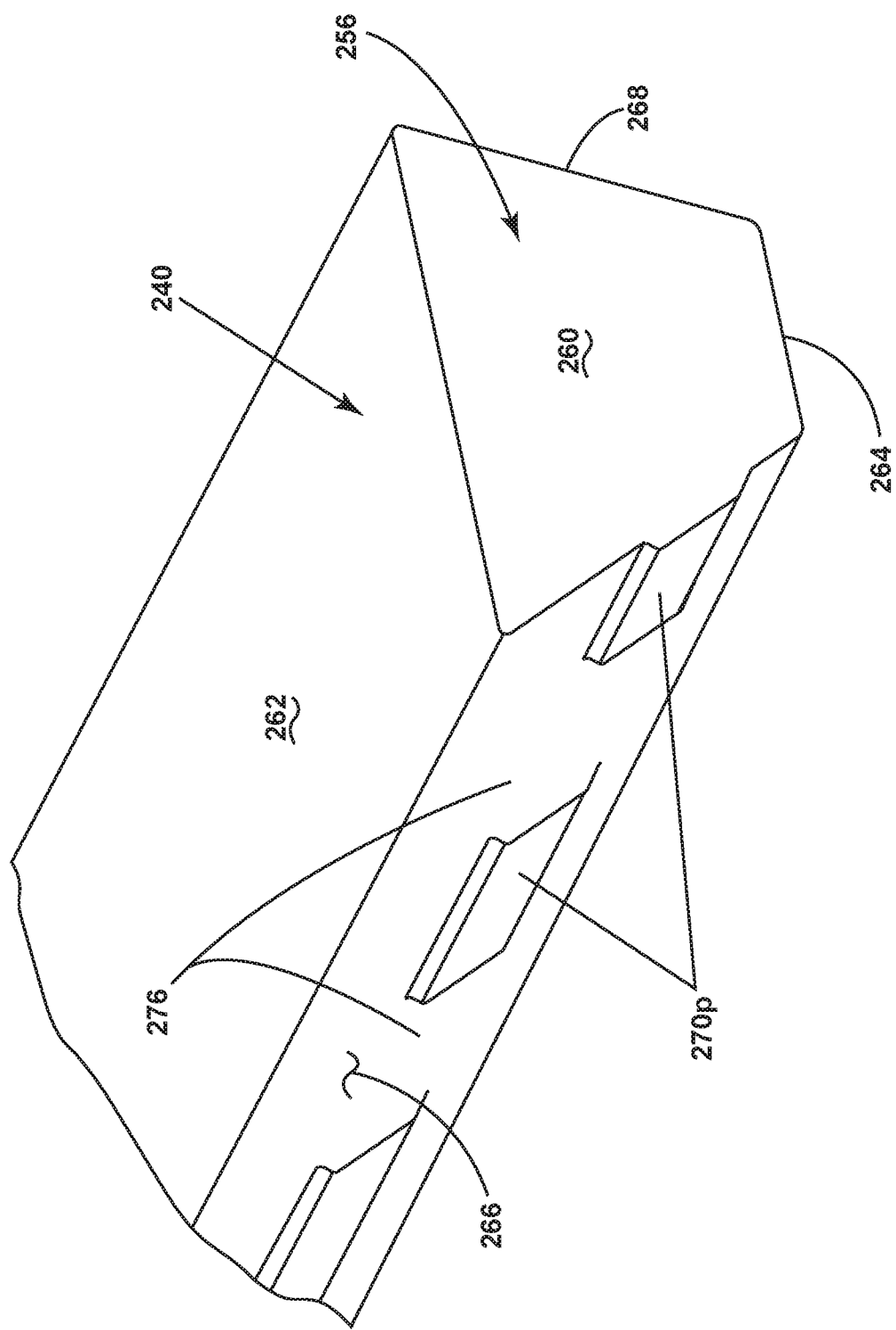
FIG. 6 is an isometric of a variation of the seal from FIG. 3 according to another aspect of the disclosure herein.

Referring now to FIG. 6, another seal 240 is illustrated. The seal 240 is similar to the seal 140, therefore, like parts will be identified with like numerals increased by 100, with it being understood that the description of the like parts of the seal 140 applies to the seal 240, unless otherwise noted. A surface feature 270 in the form of a protrusion 270p can extend intermittently along a full length (L) of the seal 240 leaving spaces 276 therebetween. The method 200 as described herein can further include intermittently engaging at least one of the non-orthogonal planar groove facets, by way of non-limiting example the opposing groove side 154h with the HP angled facet 166 of the seal 140. This enables a controlled leakage through the spaces 276 between the intermittently spaced protrusions 270p.

Figure 7:
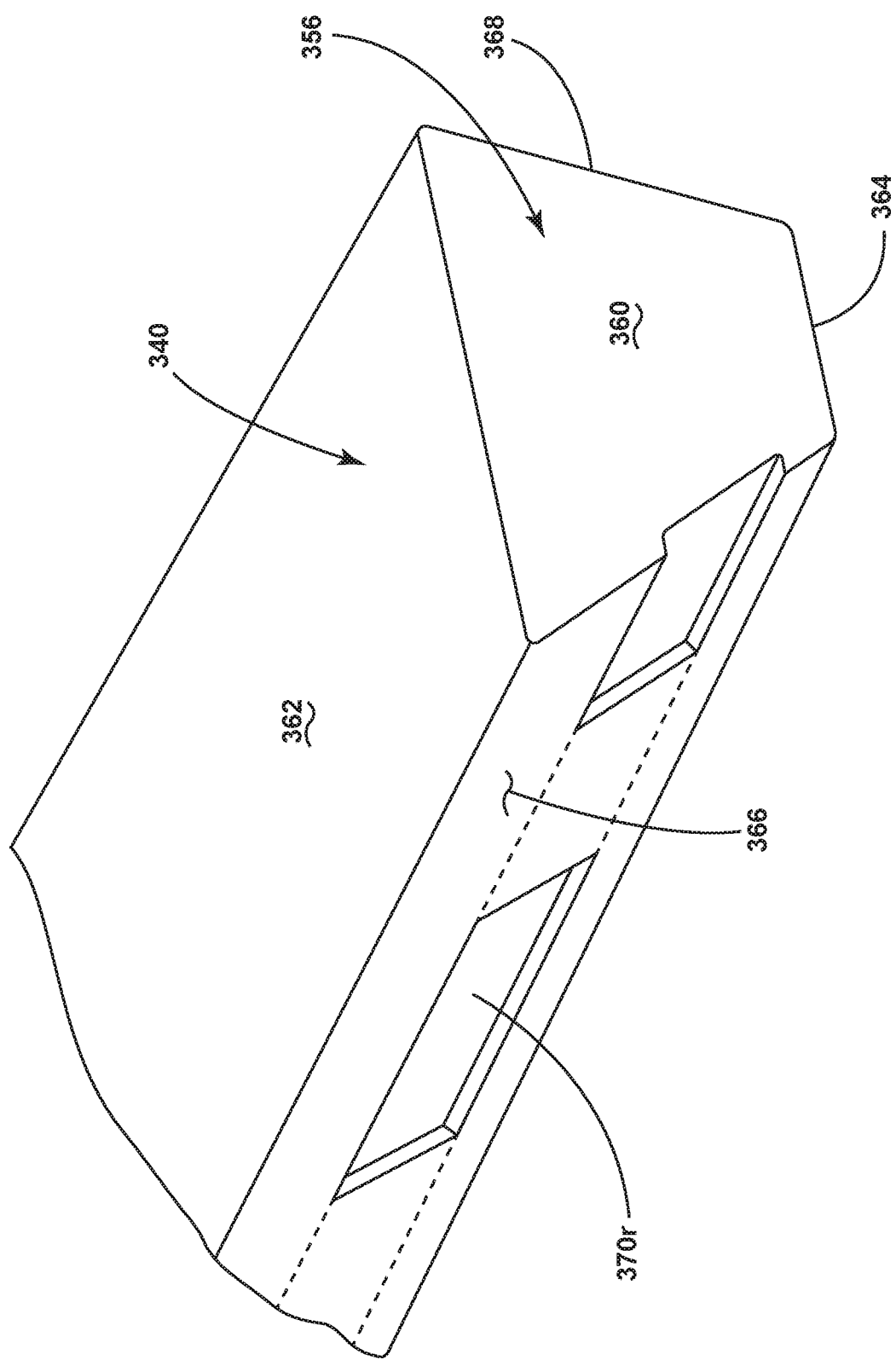
FIG. 7 is an isometric view of a variation of a seal for the vane segment of FIG. 2 according to yet another aspect of the disclosure herein.

Referring now to FIG. 7, another seal 340 is illustrated. The seal 340 is similar to the seal 140, therefore, like parts will be identified with like numerals increased by 200, with it being understood that the description of the like parts of the seal 140 applies to the seal 340, unless otherwise noted. A surface feature 370 in the form of a relief 370r can extend intermittently along a full length (L) of the seal 340. Dashed lines indicate that the relief 370r can also extend along the full length (L) of the seal 340 much like the surface feature 170 illustrated in FIG. 4. Much like the spaces 276 in FIG. 6 provide controlled leakage, the relief 370r whether extending along the full length (L) or intermittently spaced also can provide controlled leakage.

The seals described herein provide sealing and controlled leakage in areas challenging for sealing preexisting gaps, especially with regards to abutting surfaces that move. This seal includes a cross section designed to be robust to relative movement between surfaces.

Benefits include arresting or controlling leakages upstream of a variable nozzle throat to reduce chargeable leakage and improve performance. While illustrated with respect to a variable turbine vane, this seal design can be leveraged to reduce leakage in many hot-section components. The cross-sectional shape described herein adds thickness to known sealing structures which makes it more robust to burn-through risks. The surface feature is not present through the full cross-section of the seal which allows high pressure air to load the seal into place.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A seal assembly comprising a first surface and a second surface arranged in a spaced relationship to define a gap; a groove located in the second surface and having at least three non-orthogonal, planar groove facets; and a seal having a body with a height greater than or equal to a depth of the groove and a multi-faceted cross-sectional shape defining multiple seal facets, with a sub-set of the seal facets being complementary to the groove facets, and at least one of the seal facets abutting the first or second surface.

2. The seal assembly of any preceding clause wherein the multiple seal facets comprise an outer seal facet facing the first surface, an inner seal facet facing the second surface, and the sub-set of seal facets includes a pair of complementary seal facets facing the second surface.

3. The seal assembly of any preceding clause further comprising a surface feature located along at least one of the pair of complementary seal facets.

4. The seal assembly of any preceding clause wherein the surface feature is spaced from one of the inner seal facet a first dimension and extends in a direction from the inner seal facet to the outer seal facet a second dimension.

5. The seal assembly of any preceding clause wherein the surface feature extends along a full length of the body.

6. The seal assembly of any preceding clause wherein the surface feature is multiple surface features extending intermittently.

7. The seal assembly of any preceding clause wherein the surface feature is a protrusion.

8. The seal assembly of any preceding clause wherein the surface feature is a relief.

9. The seal assembly of any preceding clause wherein the pair of complementary seal facets includes a high pressure angled facet facing a high pressure region and a low pressure angled facet facing a low pressure region.

10. The seal assembly of any preceding clause wherein an angle formed between the outer seal facet and one of the pair of complementary seal facets is between 50 and 70 degrees.

11. The seal assembly of any preceding clause wherein one of the first or second surfaces is stationary with respect to the other of the first or second surfaces.

12. The turbine engine of any preceding clause wherein the first and second surfaces are both static surfaces or both moving surfaces.

13. The seal assembly of any preceding clause wherein the multi-faceted cross-sectional shape is a trapezoid.

14. A turbine engine comprising a first surface and a second surface each extending between a low pressure region and a high pressure region and arranged in a spaced relationship from each other to define a gap; a groove located in the second surface and having at least three non-orthogonal, planar groove facets; and a seal having a body with a height greater than or equal to a depth of the groove and a multi-faceted cross-sectional shape defining multiple seal facets, with a sub-set of the seal facets being complementary to the groove facets and including a high pressure angled facet facing the high pressure region and a low pressure angled facet facing the low pressure region, and at least one of the seal facets abutting the first surface.

15. The turbine engine of any preceding clause further comprising a surface feature located along at least one of the high pressure angled facet or the low pressure angled facet.

16. The turbine engine of any preceding clause wherein the multiple seal facets comprise an outer seal facet facing the first surface and an inner seal facet facing the second surface.

17. The turbine engine of any preceding clause wherein the surface feature is spaced from the inner seal facet a first dimension and extends in a direction from the inner seal facet to the outer seal facet a second dimension.

18. The turbine engine of any preceding clause wherein an angle formed between the outer seal facet and one of the high pressure angled facet or the low pressure angled facet is between 50 and 70 degrees.

19. The turbine engine of any preceding clause wherein the surface feature extends along a full length of the body.

20. The turbine engine of any preceding clause wherein the surface feature is multiple surface features extending intermittently along a full length of the body.

21. The turbine engine of any preceding clause wherein the surface feature is a protrusion.

22. The turbine engine of any preceding clause wherein the surface feature is a relief.

23. The turbine engine of any preceding clause wherein one of the first or second surfaces is stationary with respect to the other of the first or second surfaces.

24. The turbine engine of any preceding clause wherein the first and second surfaces are both static surfaces or both moving surfaces.

25. The turbine engine of any preceding clause wherein the multi-faceted cross-sectional shape is a trapezoid.

26. A method of sealing a gap located in a turbine engine between first and second surfaces, the second surface including a groove in which a seal having a body extending between an outer seal facet and an inner seal facet is located, the method comprising: flowing a high pressure airflow into the groove along at least one of three non-orthogonal planar groove facets between the body and the groove; and pushing the outer seal facet toward the first surface.

27. The method of any preceding clause further comprising engaging the outer seal facet with the first surface.

28. The method of any preceding clause further comprising intermittently engaging at least one of the non-orthogonal planar groove facets with an angled high pressure facet of the seal.

29. The method of any preceding clause further comprising engaging at least one of the non-orthogonal planar groove facets with a protrusion extending from the angled high pressure facet.

What is claimed is:

1. A seal assembly comprising:
   a first surface and a second surface each extending between a low pressure region and a high pressure region and arranged in a spaced relationship from each other to define a gap;
   a groove located in the second surface and having at least three non-orthogonal, planar groove facets; and
   a seal having a body with a height greater than or equal to a depth of the groove and a multi-faceted cross-sectional shape defining multiple seal facets, with a sub-set of the seal facets being complementary to the groove facets, and at least one of the seal facets abutting the first or second surface
   wherein the gap defines a first gap dimension between the first surface and the second surface in the high pressure region and the gap defines a second gap dimension between the first surface and the second surface in the low pressure region where a ratio of the first dimension to the second dimension is greater than 1 and less than 2.

2. The seal assembly of claim 1 wherein the multiple seal facets comprise an outer seal facet facing the first surface, an inner seal facet facing the second surface, and the sub-set of seal facets includes a pair of complementary seal facets facing the second surface.

3. The seal assembly of claim 2 further comprising a surface feature located along at least one of the pair of complementary seal facets.

4. The seal assembly of claim 3 wherein the surface feature is spaced from the inner seal facet by a first dimension and extends in a direction from the inner seal facet to the outer seal facet a second dimension.

5. The seal assembly of claim 3 wherein the surface feature extends along a full length of the body.

6. The seal assembly of claim 3 wherein the surface feature is multiple surface features extending intermittently along a full length of the body.

7. The seal assembly of claim 3 wherein the surface feature is one of a protrusion or a relief.

8. The seal assembly of claim 2 wherein the pair of complementary seal facets includes a high pressure angled facet facing the high pressure region and a low pressure angled facet facing the low pressure region.

9. The seal assembly of claim 2 wherein an angle formed between the outer seal facet and one of the pair of complementary seal facets is between 50 and 70 degrees.

10. The seal assembly of claim 1 wherein one of the first or second surfaces is stationary and the other of the first or second surfaces is moving.

11. The turbine engine of claim 1 wherein the first and second surfaces are both static surfaces or both moving surfaces.

12. The seal assembly of claim 1 wherein the multi-faceted cross-sectional shape is a trapezoid.

13. A turbine engine comprising:
    a first surface and a second surface each extending between a low pressure region and a high pressure region and arranged in a spaced relationship from each other to define a gap;
    a groove located in the second surface and having at least three non-orthogonal, planar groove facets; and
    a seal having a body with a height greater than or equal to a depth of the groove and a multi-faceted cross-sectional shape defining multiple seal facets, with a sub-set of the seal facets being complementary to the groove facets and including a high pressure angled facet facing the high pressure region and a low pressure angled facet facing the low pressure region, and at least one of the seal facets abutting the first surface
    wherein the gap defines a first gap dimension between the first surface and the second surface in the high pressure region and the gap defines a second gap dimension between the first surface and the second surface in the low pressure region where a ratio of the first dimension to the second dimension is greater than 1 and less than 2.

14. The turbine engine of claim 13 further comprising a surface feature located along at least one of the high pressure angled facet or the low pressure angled facet.

15. The turbine engine of claim 14 wherein the multiple seal facets comprise an outer seal facet facing the first surface and an inner seal facet facing the second surface and the surface feature is spaced from the inner seal facet by a first dimension and extends in a direction from the inner seal facet to the outer seal facet a second dimension.

16. The turbine engine of claim 13 wherein the surface feature extends along a full length of the body.

17. The turbine engine of claim 13 wherein the surface feature is multiple surface features extending intermittently along a full length of the body.

18. The turbine engine of claim 13 wherein the surface feature is one of a protrusion or a relief.

19. The turbine engine of claim 13 wherein one of the first or second surfaces is stationary and the other of the first or second surface is moving.

20. The turbine engine of claim 13 wherein the first and second surfaces are both static surfaces or both moving surfaces.

* * * * *